UNITED STATES PATENT OFFICE.

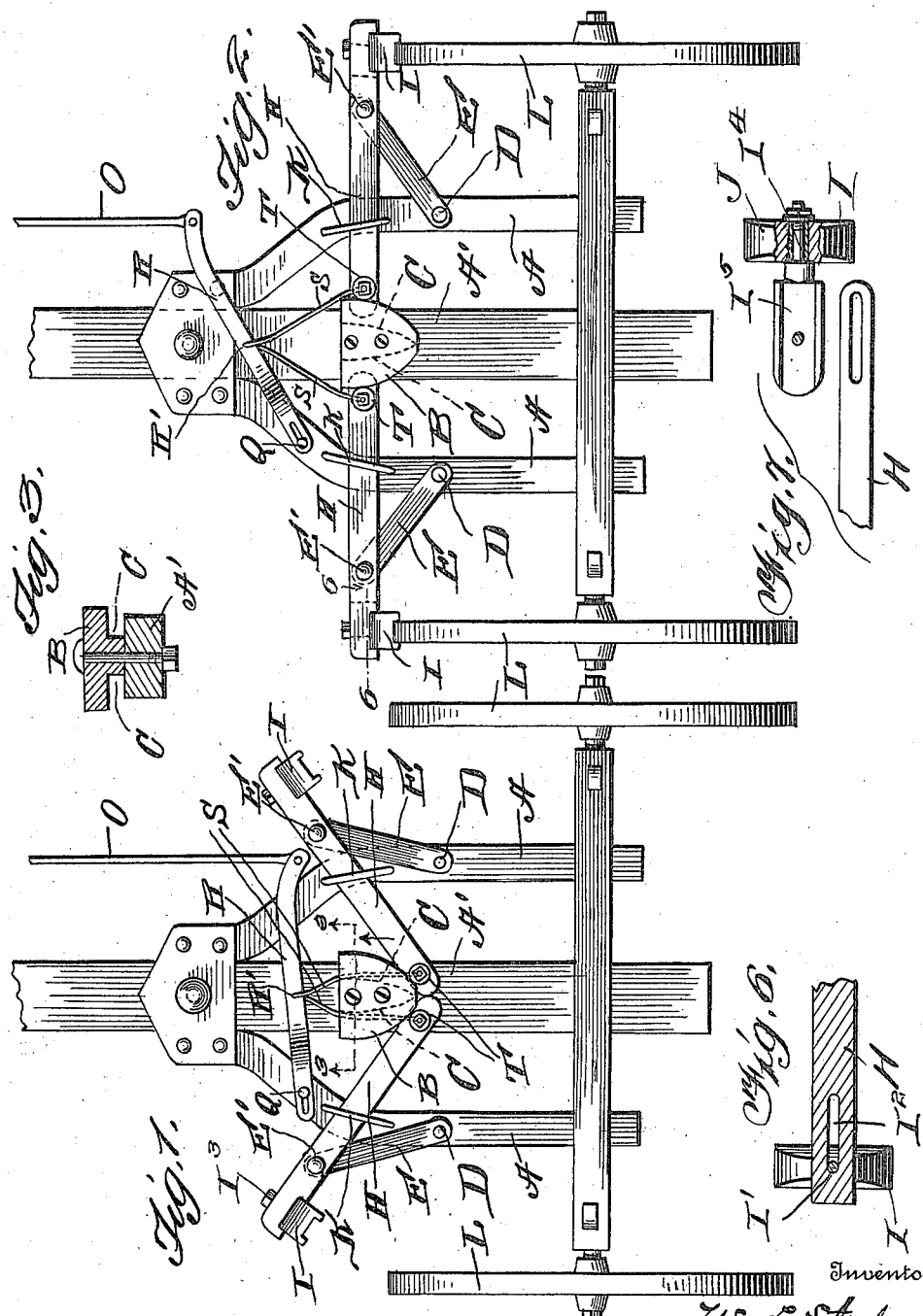

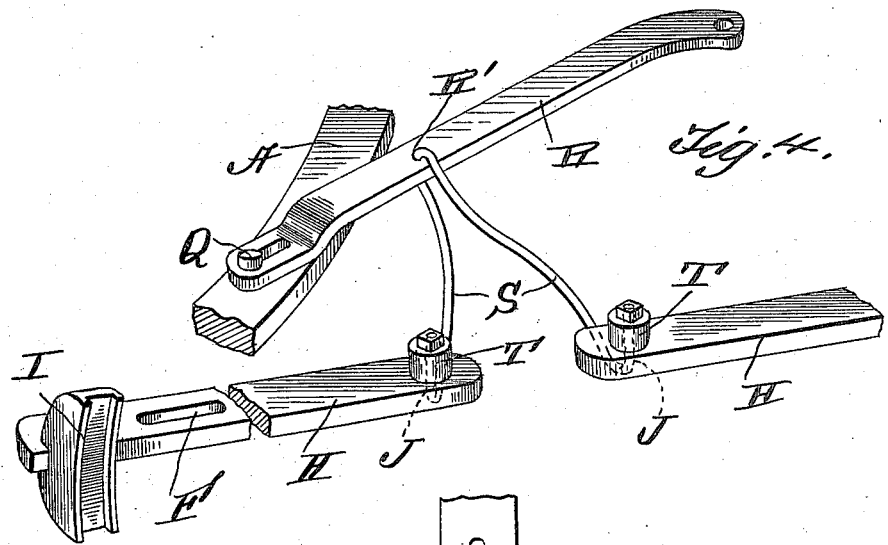
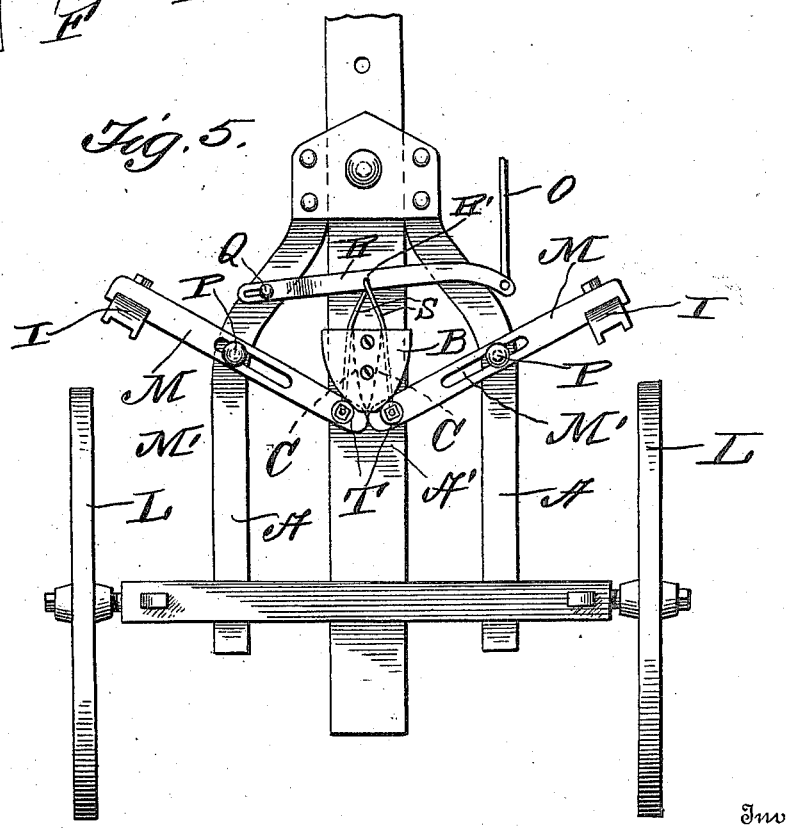

WILLIAM L. STERLING, OF BROOKLYN, PENNSYLVANIA.

VEHICLE-WHEEL BRAKE.

983,947. Specification of Letters Patent. Patented Feb. 14, 1911.

Application filed June 17, 1910. Serial No. 567,515.

*To all whom it may concern:*

Be it known that I, WILLIAM L. STERLING, a citizen of the United States, residing at Brooklyn, in the county of Susquehanna and State of Pennsylvania, have invented certain new and useful Improvements in Vehicle-Wheel Brakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in brakes for vehicle wheels and comprises a light, strong and effective apparatus so arranged that by the manipulations of lever mechanism, the brake shoes may be moved in front of the wheels and set securely, and automatically returned to their normal positions when released, thereby avoiding mud from accumulating upon the shoes.

The invention consists further of a wagon brake for vehicle wheels and comprises a toggle lever mechanism so arranged that a powerful leverage may be obtained with little motion, the parts being adjustable affording means whereby varying degrees of leverage may be obtained.

The invention comprises various other details of construction and combinations and arrangements of parts which will be hereinafter fully described and then specifically defined in the appended claims.

My invention is illustrated in the accompanying drawings, in which:—

Figure 1 is a top plan view of a running gear of a wagon, illustrating the brake shoes withdrawn from the wheels. Fig. 2 is a view showing the brakes applied and the parts of the brake mechanism shown in relative operative positions. Fig. 3 is a cross sectional view on line 3—3 of Fig. 1. Fig. 4 is an enlarged detail perspective view showing the operating lever and spring arm connections between the same and the brake shoe actuating levers. Fig. 5 is a top plan view showing a modified form of the lever mechanism showing means for adjusting the shoe and, Fig. 6 is a sectional view. Fig. 7 is a detail view of a modified form of the shoe adjustment.

Reference now being had to the details of the drawings by letter, A designates the hound of a running gear of a wagon to which my brake mechanism is applied and projecting from the reach A′ is a block B, a cross sectional view of which is shown in Fig. 3 of the drawings, which has its opposite edges recessed as at C. The opposite edges of said block taper and are slightly convexed, as shown clearly in the top plan views of the drawings. Pivotally connected to the pins D, rising from the hound, are the links or bars E. Levers H are pivotally connected at their inner ends to the bolts T and each of said levers H is apertured for the reception of a pivotal bolt E′ connecting the pivotal lever H and bar E″. At the outer end of each lever H is a brake I, and K K designate straps which are fastened to the hound and adapted to coöperate with the hounds to guide the levers H as the brake shoes are moved from their released positions, shown in Fig. 1, to the positions shown in Fig. 2 to which the brakes are set.

In order to adjust the shoe, the bolt I′ may be moved into different positions in the slot $I^2$ and held by the tightening of the nut $I^3$.

In Fig. 7 I have shown a modified form of the adjustment of the shoe in which the shoe $I^4$ is mounted on a contracted end $I^5$ of the metallic member which has an adjustable connection with the bar H.

Fixed to the hound is a pin Q, and R designates a lever, one end of which is slotted and pivotally mounted upon said pin Q, while its other end is fastened to a rod O forming means whereby the brake may be applied by any suitable lever-actuated mechanism, not shown, within convenient reach of the operator. A resilient rod S is bent upon itself and passed through an aperture R′ in the lever R and each end of the rod S is bent at an angle as at J, shown in Fig. 4 of the drawings, and passed through apertures at the inner ends of the levers H and upon the projecting portions of said ends J anti-friction rollers T are journaled which are adapted to ride one in contact with each convexed edge of the block B. It will be understood that the resilient rod S is under tension when the brakes are set and has a tendency normally to hold the brake shoes in the position shown in Fig. 1 of the drawings when the brakes are released, the resiliency of said rod serving to return the brakes to their normal positions.

In Fig. 5 of the drawings, I have shown a slight modification of my invention in which the levers M are provided with elongated slots M' at any suitable locations, preferably adjacent to their longitudinal centers, and adapted to receive the pivotal bolts P which are fastened to the hound and forming fulcrum means for causing the levers M to tilt in applying the brake or releasing the same.

The operation of my invention will be readily understood and is as follows:—When it is desired to apply the brake, it may be done by drawing forward upon the rod O, which will cause the lever R to tilt and, by reason of the resilient rod connections S between the levers carrying the brake shoes, the inner ends of said brake shoe carrying levers will be drawn forward and at the same time will be given a swinging longitudinal movement by reason of the anti-friction rollers T rolling in contact with the convexed edges of the block B. This movement will cause the brake shoes to be moved in front of and against the tires of the wheel causing, by the mechanism shown, substantially a toggle joint apparatus whereby the brake shoe may be held forcibly in a set position and requiring only the application of a like power in applying the same. As the inner end of the brake shoe carrying levers are drawn forward in the act of applying the brakes, the resilient arms of the rod S will be put under tension and serve as means automatically to return the brakes to the position shown in Fig. 1 of the drawings after the power used in applying the brakes is relieved from the rod O.

It will be noted that, when the brake shoes are released and assume the positions shown in Fig. 1 of the drawings, they will be between the wheels and so positioned as not to receive the mud and foreign matter which might drop or be thrown from the wheels by centrifugal motion as the wheels rotate.

While I have shown my brake mechanism as applied to the upper surface of the hound of the running gear of the vehicle, it will be apparent that the brake apparatus may be applied to the under surface of the hound, if desired, or to any other portions of a vehicle, such as platform, spring wagons, surreys, coaches, etc., and, while I have shown a particular construction comprising resilient rods to illustrate the principle of my invention, it will be obvious that there are other forms of spring apparatus which may be utilized instead of the resilient rod S and connected to the brake carrying bars or levers in various ways without in any way departing from the spirit of the invention.

What I claim to be new is:—

1. A brake mechanism comprising, in combination with the running gear of a vehicle, brake shoe carrying members, links pivotally connecting said members with the running gears, a resilient rod, a lever pivotally mounted upon the running gear and to which said rod is connected, the ends of said rod pivotally connected to said members, anti-friction rollers upon the ends of the said rod, a block fastened to the running gear and having convexed edges against which said rollers are adapted to bear as the lever is tilted in one direction to cause the brake shoe carrying members to be moved longitudinally and set, said resilient rod serving to normally withdraw the brakes from in front of the wheels when the lever is released.

2. A brake mechanism comprising, in combination with the running gear of a vehicle, brake shoe carrying members, links pivotally connecting said members with the running gears, a resilient rod, a lever pivotally mounted upon the running gear and to which said rod is connected, the ends of said rod being angled and pivotally connected to the inner ends of said brake shoe carrying members, anti-friction rollers upon the angled ends of said rod, a block fastened to the running gear and having its opposite edges convexed and against which the anti-friction roller is adapted to contact to cause the brake shoe carrying members to be moved longitudinally as the lever is drawn forward to apply the brakes.

3. A brake mechanism comprising, in combination with the running gear of a vehicle, brake shoe carrying members, links pivotally connecting said members with the running gears, a resilient rod, a lever pivotally mounted upon the running gear and to which said rod is connected, the ends of said rod being angled and pivotally connected to the inner ends of said brake shoe carrying members, anti-friction rollers upon the angled ends of said rod, a block fastened to the running gear and having its opposite edges convexed and against which the anti-friction roller is adapted to contact to cause the brake shoe carrying members to be moved longitudinally as the lever is drawn forward to apply the brakes, and means for limiting the forward movement of said anti-friction rollers.

4. A brake mechanism comprising, in combination with the running gear of a vehicle, brake shoe carrying members, links pivotally connecting said members with the running gears, a resilient rod, a lever pivotally mounted upon the running gear and to which said rod is connected, the ends of said rod being angled and pivotally connected to the inner ends of said brake shoe carrying members, anti-friction rollers upon the angled ends of said rod, a block fastened to the running gear and having its opposite edges convexed and against which the anti-friction roller is adapted to contact to cause the brake shoe carrying members to be moved longitudinally as the lever is drawn forward to apply the brakes, the edges of said block being recessed to receive the inner ends of said members.

5. A brake mechanism comprising, in combination with the hound of a running gear of a vehicle, links pivotally connected at their rear ends to said hound, brake shoe carrying levers having adjustable pivotal connections with said links, means for guiding said levers, a block fastened to the running gear and having its opposite edges inclined, a pivotal operating lever, a resilient rod pivotally connected to said operating lever and having each end bent at an angle and pivotally connected one to each inner end of said brake shoe carrying lever, an anti-friction roller journaled upon each angled end of said rod and adapted to move against the inclined edge of said block, said rod being adapted to be put under tension as the brakes are applied and serving to normally release the brakes and withdraw the same between the wheels.

In testimony whereof I hereunto affix my signature in the presence of two witnesses.

WILLIAM L. STERLING.

Witnesses:
   I. H. HATFIELD,
   W. L. McCLAY.